(12) United States Patent
Yano et al.

(10) Patent No.: US 6,793,962 B2
(45) Date of Patent: Sep. 21, 2004

(54) EL PHOSPHOR MULTILAYER THIN FILM AND EL DEVICE

(75) Inventors: Yoshihiko Yano, Tokyo (JP); Tomoyuki Oike, Tokyo (JP); Yukihiko Shirakawa, Tokyo (JP); Katsuto Nagano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/866,691

(22) Filed: May 30, 2001

(65) Prior Publication Data

US 2002/0060325 A1 May 23, 2002

(30) Foreign Application Priority Data

Nov. 17, 2000 (JP) ........................................ 2000-351861

(51) Int. Cl.[7] .............................. B05D 5/06; C09K 11/68
(52) U.S. Cl. ...................... 427/66; 427/162; 427/165; 252/301.4 R; 252/301.6 R
(58) Field of Search ................... 257/103; 252/301.4 R, 252/301.6 R; 427/66, 162, 165

(56) References Cited

U.S. PATENT DOCUMENTS

| | | | | |
|---|---|---|---|---|
| 4,532,454 A | * | 7/1985 | Abdalla | 313/506 |
| 4,547,703 A | * | 10/1985 | Fujita et al. | 313/509 |
| 5,309,070 A | * | 5/1994 | Sun et al. | 313/503 |
| 5,598,059 A | | 1/1997 | Sun et al. | |
| 5,780,966 A | | 7/1998 | Kato et al. | |
| 5,834,053 A | * | 11/1998 | Dye et al. | 427/66 |
| 5,897,812 A | * | 4/1999 | Kitai et al. | 252/301.4 R |
| 6,004,618 A | * | 12/1999 | Mizutani et al. | 427/66 |

FOREIGN PATENT DOCUMENTS

| | | |
|---|---|---|
| EP | 0 720 418 A1 | 7/1996 |
| EP | 0 740 490 A1 | 10/1996 |
| JP | 61-250993 | 11/1986 |
| JP | 62-44989 | 2/1987 |
| JP | 07 122364 A | 5/1995 |
| JP | 8-134440 | 5/1996 |
| JP | 2840185 | 10/1998 |
| WO | WO 98 18721 | 5/1998 |

OTHER PUBLICATIONS

M. Kawanishi, et al., Technical Report of IEICE. EID98–113, pp. 19–24, "$CaAl_2S_4$:Ce Thin Film EL Devices Prepared by the Two Targets Pulse Electron–Beam Evaporation", Jan. 1999 (with partial English translation).

(List continued on next page.)

Primary Examiner—Jerome Jackson
Assistant Examiner—Joseph Nguyen
(74) Attorney, Agent, or Firm—Oblon, Spivak, McClelland, Maier & Neustadt, P.C.

(57) ABSTRACT

The invention has for its object to provide an EL phosphor multilayer thin film and EL device which can emit light with improved luminance. This object is achieved by the provision of an EL phosphor multilayer thin film wherein a phosphor thin film and a dielectric thin film are stacked one upon another. The phosphor thin film comprises a matrix material containing as a main component at least one compound selected from an alkaline earth thioaluminate, an alkaline earth thiogallate and an alkaline earth thioindate, and an rare earth element as a luminescent center, and the dielectric thin film comprises an alkaline earth oxide. There is also provided an EL device comprising such an EL phosphor multilayer thin film.

8 Claims, 5 Drawing Sheets

OTHER PUBLICATIONS

N. Miura, et al., Jpn. J. Appl. Phys., vol. 38, Part 2, No. 11B, pp. L1291–L1292, "High–Luminance Blue–Emitting $BaAl_2S_4$: Eu Thin –Film Electroluminescent Devices", 1999.

I. Tanaka, et al., The 22nd Seminar Data Photoelectric Inter–Conversion the 125th Commission EL Department, pp. 16–21, "Composition and Optical Properties of Blue–E-mitting $BaAl_2S_4$:$Eu^{2+}$ Electroluminescent Thin Films", May 26, 2000. (with English concise explanation).

S. Oshio, et al., Display and Imaging, vol. 3, No. 2, pp. 181–187, "Novel Eletroluminescent Thin Films: Thiogallate–Type Phosphors", 1994. (with English concise explanation).

P. C. Donohue, et al., J. Electrochem. Soc., vol. 121, No. 1, pp. 137–141, "The Synthesis and Photoluminescence of $M^{11}$ $M_2^{111}$ $(S_1Se)_4$", Jan. 1974.

P. Benalloul, et al., Appl. Phys. Lett., vol. 63, No. 14, pp. 1954–1956, "$IIA–III_2–S_4$ Ternary Compounds: New Host Matrices for Full Color Thin Film Electroluminescence Displays", Oct. 4, 1993.

K. T. Le Thi, et al., Materials Science and Engineering, B14, pp. 393,397, "Investigation of the $MS–Al_3S_2$ Systems (M=Ca, Sr, Ba) and Luminescence Properties of Europium–Doped Thioaluminates", 1992.

* cited by examiner

EL PHOSPHOR MULTILAYER THIN FILM AND EL DEVICE

BACKGROUND OF THE INVENTION

1. Art Field

The present invention relates generally to a phosphor substance used for EL (electroluminescence) devices, and more particularly to an EL phosphor multilayer thin film and an EL device.

2. Background Art

Figure 2:
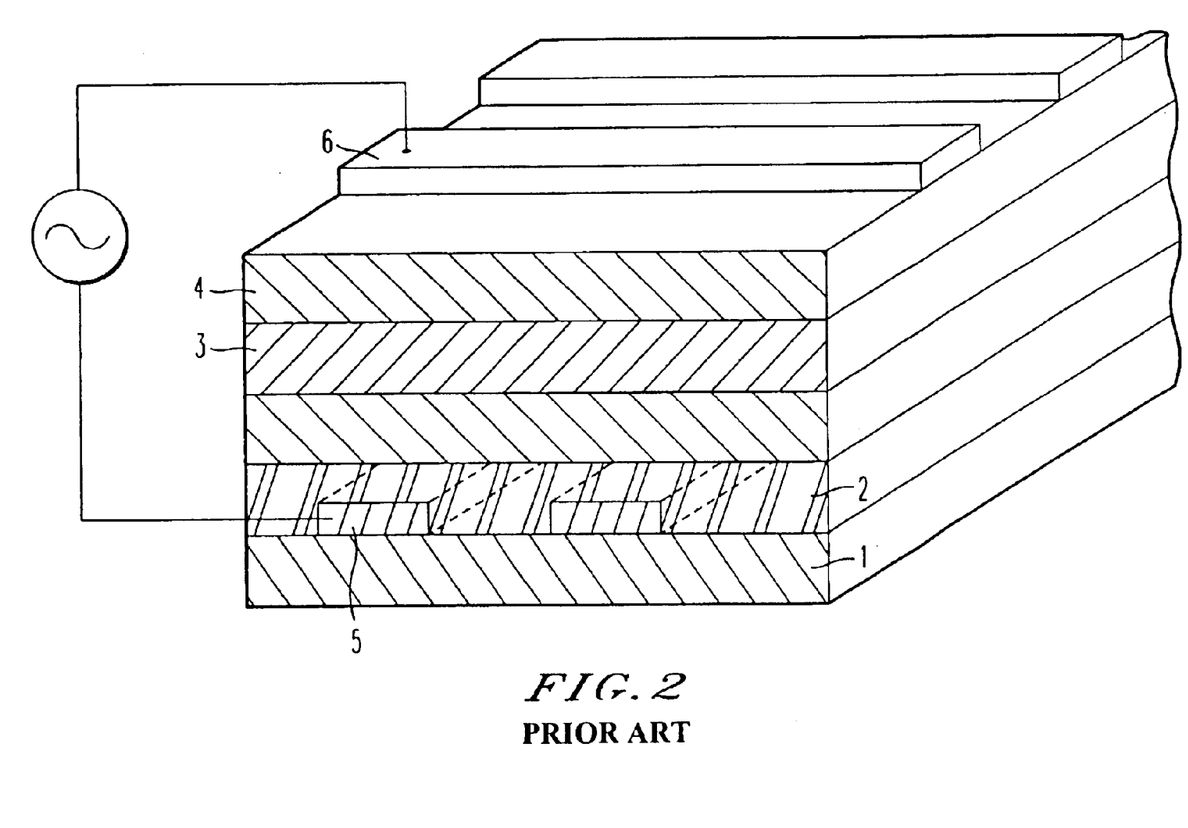
FIG. 2 is a sectional view in schematic form illustrative of a conventional double-insulation type EL device structure.

In recent years, thin-film EL devices have been increasingly studied for compact or large yet lightweight flat display panels. A monochromatic thin-film EL display using a fluorescent thin film comprising manganese-added zinc sulfide for yellowish orange light emission has already been practically used in the form of a double-insulation structure using thin-film insulating layers 2 and 4 as shown in FIG. 2. Referring to FIG. 2, a lower electrode 5 is formed in a given pattern on a glass substrate 1, and a first insulating layer 2 in the form of a dielectric thin film is provided on the lower electrode 5. On the first insulating layer 2, there are provided a light-emitting layer 3 and a second insulating layer (dielectric thin film) 4 in this order. An upper electrode 6 is formed on the second insulating layer 4 in such a given pattern as to form a matrix with the lower electrode 5. Usually, the phosphor thin film has been annealed at a temperature lower than the strain point of the glass substrate for luminance improvements.

Recently, a structure using a ceramic substrate for the substrate 1 and a thick-film dielectric layer for the insulating layer 2 has also been put forward. With this structure wherein a ceramic material such as alumina is used as the substrate, it is possible to anneal the phosphor thin film at high temperature, thereby achieving luminance improvements. Because the thick-film dielectric layer is used for the insulating layer, this structure also features the ability to provide a panel having higher resistance to dielectric breakdowns and higher reliability than does an EL device using a thin film for the insulating layer.

To accommodate well to personal computer displays, TV displays and other displays, color displays are absolutely needed. Thin-film EL displays using a sulfide fluorescent material thin film are satisfactory in reliability and resistance to environmental conditions. At present, however, they are thought of as being unsuitable for color display purposes, because the properties of an EL fluorescent material for emitting the three primary colors or red, green and blue are less than satisfactory. Candidates for a blue emitting fluorescent substance are SrS:Ce where SrS is used as a matrix material and Ce as a luminescent center, $SrGa_2S_4$:Ce and ZnS:Tm, candidates for a red emitting fluorescent substance are ZnS:Sm and CaS:Eu, and candidates for a green emitting fluorescent substance are ZnS:Tb, CaS:Ce, etc., and studies thereof are now under way.

These phosphor thin film for emitting the three primary colors, viz., red, green and blue are poor in light emission luminance, efficiency, color purity, etc., and so color EL panels are still on impractical levels. For blue in particular, relatively high luminance is obtained using SrS:Ce. However, such luminance is still unsatisfactory for blue applied to full-color displays, with color purity shifted to a green side. Thus, much improved blue emitting layers are in great demand.

To provide a solution to these problems, thiogallate or thioaluminate blue fluorescent substances such as $SrGa_2S_4$:Ce, $CaGa_2S_4$:Ce and $BaAl_2S_4$:Eu are now under development, as set forth in JP-A's 07-122364 and 08-134440, Shingaku Giho EID98-113, pp. 19–24, and Jpll. J. Appl. Phys. Vol. 38, (1999), pp. L1291–1292.

The inventors, too, have made studies of thioaluminate blue fluorescent substance on the premise that blue EL materials of high luminance are essentially required for the achievement of full-color EL panels. However, the resultant luminance is at most 100 $cd/m^2$ on 1 kHz driving and so is still less than practical.

SUMMARY OF THE INVENTION

To provide a solution to the aforesaid problems, there is an increasing demand for a fluorescent substance capable of emitting light with high luminance, especially a blue phosphor thin-film material. An object of the invention is to provide an EL phosphor multilayer thin film capable of emitting light with enhanced luminance and an EL device.

Such an object is achievable by any one of the following embodiments (1) to (8) of the invention.

(1) An EL phosphor multilayer thin film, wherein:

a phosphor thin film and a dielectric thin film are stacked one upon another, said phosphor thin film comprising a matrix material containing as a main component at least one compound selected from an alkaline earth thioaluminate, an alkaline earth thiogallate and an alkaline earth thioindate, and an rare earth element as a luminescent center, and said dielectric thin film comprising an alkaline earth oxide.

(2) The EL phosphor multilayer thin film according to (1) above, wherein said matrix material is a barium thioaluminate.

(3) The EL phosphor multilayer thin film according to (1) above, wherein said rare earth element is Eu.

(4) The EL phosphor multilayer thin film according to (1) above, wherein said alkaline earth oxide is a perovskite oxide.

(5) The EL phosphor multilayer thin film according to (1) above, wherein said alkaline earth oxide is barium titanate.

(6) The EL phosphor multilayer thin film according to (1) above, wherein said dielectric thin film has a specific dielectric constant of 100 or greater.

(7) The EL phosphor multilayer thin film according to (1) above, wherein said dielectric thin film has a thickness of 100 nm or greater.

(8) An EL device comprising an EL phosphor multilayer thin film as recited in (1) above.

The present invention has been accomplished in the process of phosphor thin-film formation experiments made with a view to bringing the luminance of a thioaluminate blue phosphor substance up to a practical level. The thus achieved EL phosphor multilayer thin film makes a breakthrough in light emission luminance over a conventional EL phosphor thin film.

EXPLANATION OF THE PREFERRED EMBODIMENTS

Some preferred embodiments of the present invention are now explained in detail.

The present invention provides an EL phosphor multi-layer thin film, the luminance of which is improved by virtue of a structure wherein the fluorescent thin film and dielectric thin film are stacked one upon another.

There are still a lot of uncertainty about the mechanism of why thioaluminate, thiogallate or thioindate EL fluorescent thin films are capable of emitting light.

An analysis of blue light-emitting $BaAl_2S_4$:Eu thin films is carried out in JSPS, the EL Subcommittee of the 125th Committee on Photoelectric Conversion, the 22nd Workshop paper, pp. 16–21. The paper shows that $BaAl_2S_4$ emits light in different areas in the thickness direction and emits strong light at an area near to the film surface, has a composition distribution in the thickness direction, and contains a large amount of oxygen. However, the mechanism of why strong light emission is obtained has yet to be clarified.

The inventors have found that the emission of blue light stronger than ever before can be obtained by stacking a $BaAl_2S_4$:Eu thin film and a $BaTiO_3$ thin film one upon another.

Ternary compounds such as alkaline earth thioaluminate, alkaline earth thiogallate and alkaline earth thioindate have usually a higher crystallization temperature than do binary compounds such as ZnS and SrS, and so require a high-temperature process such as a film-formation process at 500° C. or higher, and a high-temperature annealing process at 800° C. or higher. It is believed that such high-temperature processes enable the EL matrix material, luminescent center and EL thin-film structure in the multilayer film comprising a $BaAl_2S_4$:Eu thin film and a $BaTiO_3$ thin film to be optimized under suitable conditions to emit strong light.

Upon the mutilayer film comprising a $BaAl_2S_4$:Eu thin film and a $BaTiO_3$ thin film subjected to the high-temperature process, Ba and oxygen are diffused into the portion of the $BaAl_2S_4$:Eu thin film near to the $BaTiO_3$ thin film, so that the matrix material layer suitable for the light emission of the Eu luminescent center is formed.

In the high-temperature process, Ba and S are diffused from the $BaAl_2S_4$:Eu thin film to the $BaTiO_3$, so that the matrix material layer suitable for the light emission of the Eu luminescent center is formed.

An EL device emits light through the collision of electrons injected from an associated electrode with the luminescent center in the matrix material. The multilayer thin film comprising the $BaAl_2S_4$:Eu and $BaTiO_3$ thin films provides an interface suitable for electron injection, so that electrons can be effectively injected into the $BaAl_2S_4$:Eu thin film.

The $BaAl_2S_4$:Eu thin film is formed on an underlying structure comprising a substrate/electrode/insulating film, and so elements diffuse into, and react with, the underlying structure materials during its formation or annealing after its formation. By interposing the $BaTiO_3$ thin film between the underlying structure and the $BaAl_2S_4$:Eu thin film, this thin film does not receive any damage from the underlying structure. For instance, metal Li, Na, Au and Pb ions in particular are of high ion migration capability, and behave as movable ions in the light-emitting layer with a high electric field applied thereto, producing considerable influences on the light emission properties and, hence, particularly large influences on the light emission luminance and long-term reliability. Such elements include Li, Pb or the like contained in glass used as the substrate, Li, Pb, Bi or the like which are contained in a ceramic material used as the substrate and employed as additives such as sintering aids, and Pb or the like contained in a lead-based dielectric material used as the substrate, and so on.

In the present invention, light emission is achieved with high luminance through the interactions of these elements.

An alkaline earth sulfide is preferred for the fluorescent thin film used herein. In particular, ternary compounds such as alkaline earth thioaluminate, alkaline earth thiogallate and alkaline earth thioindate are preferred to this end. Of the ternary sulfur compounds, barium thioaluminates are particularly preferred for the present invention because of a high crystallization temperature. Most preferred is a barium thioaluminate with Eu added thereto as a luminescent center, which is found to be effective for emitting blue light of high color purity with high luminance.

The ternary compounds such as alkaline earth thioaluminate, alkaline earth thiogallate and alkaline earth thioindate are generally represented by $A_xB_yS_z$ which may be exemplified by any one of $AB_2S_4$, $AB_4S_7$, $A_2B_2S_5$, $A_4B_2S_7$ and $A_5B_2S_8$.

Use may also be made of alkaline earth aluminate, alkaline earth gallate and alkaline earth inlate wherein the S in such thio compounds is replaced by O as well as oxysulfides intermediate between the oxides such as alkaline earth aluminate, alkaline earth gallate and alkaline earth inlate and the sulfides such as alkaline earth thioaluminate, alkaline earth thiogallate and alkaline earth thioindate.

In particular, the barium thioaluminates used herein include $Ba_5Al_2S_8$, $Ba_4Al_2S_7$, $Ba_2Al_2S_5$, $BaAl_2S_4$, $BaAl_4S_7$, $Ba_4Al_{14}S_{25}$, $BaAl_8S_{13}$, $BaAl_{12}S_{19}$ and so on. For the matrix material, these may be used alone or in admixture of two or more, and may be used in an amorphous state having no definite crystal structure as well.

For the rare earth element contained as the luminescent center, use is made of a rare earth element selected from at least the group consisting of Sc, Y, La, Ce, Pr, Nd, Gd, Tb, Ho, Er, Tm, Lu, Sm, Eu, Dy and Yb. However, it is preferable that Eu is used for a blue fluorescent substance; Ce, Tb, and Ho as a green fluorescent substance; and Sm, Yb, and Nd as a red fluorescent substance, all used in combination with the barium thioaluminate matrix material. In particular, Eu is most preferred as the blue fluorescent substance. In combination with a strontium thiogallate matrix material, Eu is preferred as a green fluorescent substance, and in combination with a strontium thioindate matrix material and a barium thioindate matrix material, Sm, Yb, and Nd is preferred as a red fluorescent substance. The amount of the rare earth element added should preferably be 0.5 to 10 at % with respect to the alkaline earth atom.

Comprising the aforesaid matrix material with Eu added thereto, the phosphor thin film of the present invention should preferably have a compositon represented by the following formula:

$Ba_xAl_yO_zS_w$:Eu

In this formula, x, y, z and w are indicative of the atomic ratios of the elements Ba, Al, O and S, respectively. For x, y, z and w, it is preferable that x=1 to 5 y=1 to 15 z=3 to 30 w=3 to 30

It is preferable that such a phosphor thin film is obtained typically by the following reactive evaporation process. This process is now explained while taking a barium thioaluminate:Eu phosphor thin film as an example.

A barium thioaluminate pellet with Eu added thereto is first prepared. Then, this pellet is subjected to EB evaporation in a vacuum chamber with $H_2S$ gas introduced therein. Here the $H_2S$ gas is used to make up for a deficiency of sulfur.

Besides, the phosphor thin film may be fabricated by the following multi-reactive evaporation processes.

For instance, preference is given to a binary reactive evaporation process using a barium sulfide pellet or aluminum sulfide pellet with Eu added thereto, and $H_2S$ gas.

The Eu to be added is given to the starting material in the form of a metal, fluoride, oxide or sulfide, and the amount of Eu varies with the starting material and the formed thin film. Accordingly, it is preferable to determine an appropriate amount of Eu by control of the starting material composition.

During the evaporation process, the substrate is preferably maintained at a temperature of room temperature to 700° C., and especially 400° C. to 550° C. When the temperature of the substrate is too low, it is not only impossible to take full advantage of the interaction between the phosphor thin film and the underlying dielectric thin film, but also the crystallographic properties of the phosphor thin film become worse. Too high a substrate temperature causes a deterioration in the interface between the phosphor thin film and the underlying dielectric thin film or the surface of the phosphor thin film to have noticeable asperities, which may otherwise offer problems such as pinholes in the thin film and current leakage from an EL device. In addition, the thin film is colored in brown. For these reasons, the aforesaid temperature range is preferred. Furthermore, it is preferable to carry out annealing at a temperature of 600° C. to 1,000° C., especially 750° C. to 900° C. after film formation.

The thus formed phosphor thin film should preferably have high crystallographic properties. The crystallographic properties may be evaluated typically by X-ray diffraction. To enhance the crystallographic properties, it is preferable to keep the substrate at as high a temperature as possible. This may also be effectively achieved by annealing the obtained thin film in a vacuum, $N_2$, Ar, S vapor, $H_2S$ or the like.

While the thickness of the light-emitting layer is not critical, it is appreciated that too large a thickness results in a driving voltage increase whereas too small a thickness leads to a drop of light emission efficiency. To be more specific, the light-emitting layer has a thickness of about 100 to 2,000 nm, and especially about 150 to 700 nm, although varying with the fluorescent material used.

The pressure for evaporation should preferably be $1.33 \times 10^{-4}$ to $1.33 \times 10^{-1}$ Pa ($1 \times 10^{-6}$ to $1 \times 10^{-3}$ Torr). In particular, the $H_2S$ gas for making up for sulfur should be introduced at a controlled pressure of $6.65 \times 10^{-3}$ to $6.65 \times 10^{-2}$ Pa ($5 \times 10^{-5}$ to $5 \times 10^{-4}$ Torr). At a pressure higher than this, it is very difficult to gain composition control due to the unstable operation of an E gun. The amount of the $H_2S$ gas introduced should preferably be 5 to 200 SCCM, and especially 10 to 30 SCCM although depending on the capacity of the vacuum system.

If required, it is acceptable to move or rotate the substrate during evaporation. By moving or rotating the substrate, it is possible to obtain a thin film having uniform composition with a reduced variation in the thickness distribution thereof.

The substrate may be rotated at preferably at least 10 rpm, more preferably 10 to 50 rpm, and even more preferably about 10 to 30 rpm. When the revolutions per minute of the substrate are too large, problems tend to arise in connection with sealability upon the introduction of the substrate in the vacuum chamber. When the revolutions per minute is too small, composition variations occur in the thickness direction in the vacuum chamber with the result that the properties of the formed light-emitting layer drop. Means for rotating the substrate may be built up of known rotational mechanisms using a power source comprising a motor, a hydraulic rotational mechanism, etc. and a power transmission and reduction mechanism comprising a combination of gears, belts, pulleys, etc.

Any desired heating means for heating the evaporation sources or the substrate may be used provided that it has the predetermined heat capacity and reactivity, etc. For instance, tantalum wire heaters, sheathed heaters, and carbon heaters may be used. The evaporation sources or the substrate should be heated to a temperature of about 100 to 1,400° C. using the heating means, with a temperature control precision of about $\pm 1°$ C., and preferably about $\pm 0.5°$ C. at 1,000° C.

According to the present invention, the aforesaid phosphor thin film and the dielectric thin film comprising an alkaline earth oxide are stacked one upon another. Preferably in view of control of the interaction between the phosphor thin film and the dielectric thin film, a dielectric material using the same alkaline earth element as in the alkaline earth sulfide used as the main component of the phosphor thin film should be used.

Dielectric materials containing ions harmful to the phosphor thin film are not preferred. For instance, metal Li, Na, Au and Pb ions in particular are of high ion migration capability, and behave as movable ions in the light-emitting layer with a high electric field applied thereto, producing considerable influences on the light emission properties and, hence, particularly large influences on the light emission luminance and long-term reliability. The dielectric thin film used herein also takes a role in blocking harmful ions coming from the underlying structure against the phosphor thin film. Accordingly, the dielectric material used herein should have a reduced diffusion coefficient of harmful ions. The thicker the dielectric thin film, the higher the block effect is.

The dielectric thin film should preferably have as large a thickness as possible. However, a dielectric thin film having a low specific dielectric constant is not preferable because when it is used as a part of an EL device, the voltage required for EL driving increases due to a drop of the voltage effectively applied to the phosphor thin film. Accordingly, a dielectric material having a relatively high specific dielectric constant is preferred. For alkaline earth oxides having a high specific dielectric constant, it is preferable to use composite oxides.

For instance, the following materials, and mixtures of at least two of the following materials are preferred.

(A) Perovskite Material

This is exemplified by $CaTiO_3$, $SrTiO_3$, $BaTiO_3$, $BaZrO_3$, $CaZrO_3$ and $SrZrO_3$. Such simple perovskite compounds, composite perovskite compounds containing three or more metal elements, and composite or layer-structured various perovskite compounds may be used.

(B) Tungsten Bronze Material

This is exemplified by tungsten bronze oxides, e.g., SBN (strontium-barium niobate), $SrNb_2O_6$ and $Ba_3Nb_{10}O_{28}$.

These materials, for the most part, are ferroelectric materials having a phase transition point higher than room temperature and a specific dielectric constant of 100 or higher. The materials are now explained.

Of the perovskite materials (A), $BaTiO_3$, Sr-based perovskite compounds, etc. are generally represented by the chemical formula: $ABO_3$, wherein A and B are each a cation. It is then preferable that A is at least one selected from Ca, Ba, Sr, La and Cd, and B is at least one selected from Ti, Zr, Ta and Nb.

In such perovskite compounds, the ratio A/B should be preferably 0.8 to 1.3, and more preferably 1.0 to 1.3. All perovskite compounds may crystallographically contain the aforesaid harmful ions such as lead ions at the A site. Taking a $BaTiO_3$ composition as an example, when the starting composition for the formation of a $BaTiO_3$ layer is such that the A site atom Ba is deficient with respect to the B site atom Ti as represented by $Ba_{1-x}TiO_{3-x}$, the Ba-deficient site in the $BaTiO_3$ layer is easily replaced by the aforesaid harmful ion component, yielding a $(Ba_{1-x}Pb_x)TiO_3$ layer as an example. When the phosphor thin film is formed on the $BaTiO_3$ layer in such a state, no sufficient harmful ion-blocking effect is obtained because the phosphor thin film comes in direct contact with the lead component that are harmful ions.

It is thus preferred that the composition of the perovskite compound should be at least stoichiometric; however, it may be shifted to an A site excess side from the stoichiometric composition.

By limiting the ratio A/B to such a range, it is possible to ensure the insulating properties of the dielectric material and improve the crystallographic properties of the dielectric material and, hence, the dielectric properties thereof. However, at the ratio A/B less than 0.8 no effect on improvements in crystallographic properties is expectable, whereas at the ratio A/B exceeding 1.3 it is difficult to form any uniform thin film.

Such A/B is achievable by control of the film-formation conditions. The ratio of O in $ABO_3$ is not limited to 3. Some perovskite compounds are found to have a stable structure in an excess or deficiency of oxygen; the value of x in $ABO_x$ is usually of the order of 2.7 to 3.3. It is here noted that the ratio A/B may be found by X-ray fluorescence analysis.

For the tungsten bronze materials (B), those set forth in "A Collection of Ferroelectric Materials", Landoit-Borenstein, Vol. 16 are preferred. A tungsten bronze material is generally represented by the chemical formula: $A_yB_5O_{15}$ wherein A and B are each a cation. It is then preferable that A is at least one selected from Mg, Ca, Ba, Sr, a rare earth and Cd, and B is at least one selected from Ti, Zr, Ta, Nb, Mo, W, Fe and Ni.

The ratio O/B in such tungsten bronze compounds is not limited to 15/5. Some tungsten bronze materials are found to have a stable tungsten bronze structure in a deficiency or excess of oxygen; the ratio O/B is usually of the order of 2.6 to 3.4.

The dielectric thin film has a resistivity of $10^8$ Ω·cm or greater, and especially of the order of $10^{10}$ to $10^{18}$ Ω·cm. In view of prevention of the diffusion of lead or other harmful ions, the dielectric thin film should preferably have as large a thickness as possible. According to the inventors' studies, however, the thickness must be preferably 200 nm or greater, and more preferably 400 nm or greater. The thickness may be more increased, if there is no problem in connection with the decrease in effective specific dielectric constant. The dielectric thin film has a specific dielectric constant of $\epsilon$=ca. 100 to 10,000 and a thickness of 100 nm to 5 $\mu$m, and more preferably 200 nm to 1 $\mu$m.

Even when the thickness of the dielectric thin film is 200 nm or less, a certain diffusion preventive effect is obtained. However, the dielectric thin film is easily affected by minute surface defects in the underlying structure or the surface roughness thereof and a local surface roughness of the underlying structure due to the deposition of dust, etc. ascribable to the production process, and so any perfect diffusion preventive effect is hardly obtained. There is thus a possibility that the local diffusion of harmful ions cause problems such as a local luminance drop and deterioration of the phosphor thin film.

No particular limitation is imposed on how to form the dielectric thin film. However, it is preferable to use processes by which films of 200 nm to 5 $\mu$m in thickness are easily obtained, for instance, a sputtering process, an evaporation process, a sol-gel process, and a printing-and-firing process.

Figure 1:
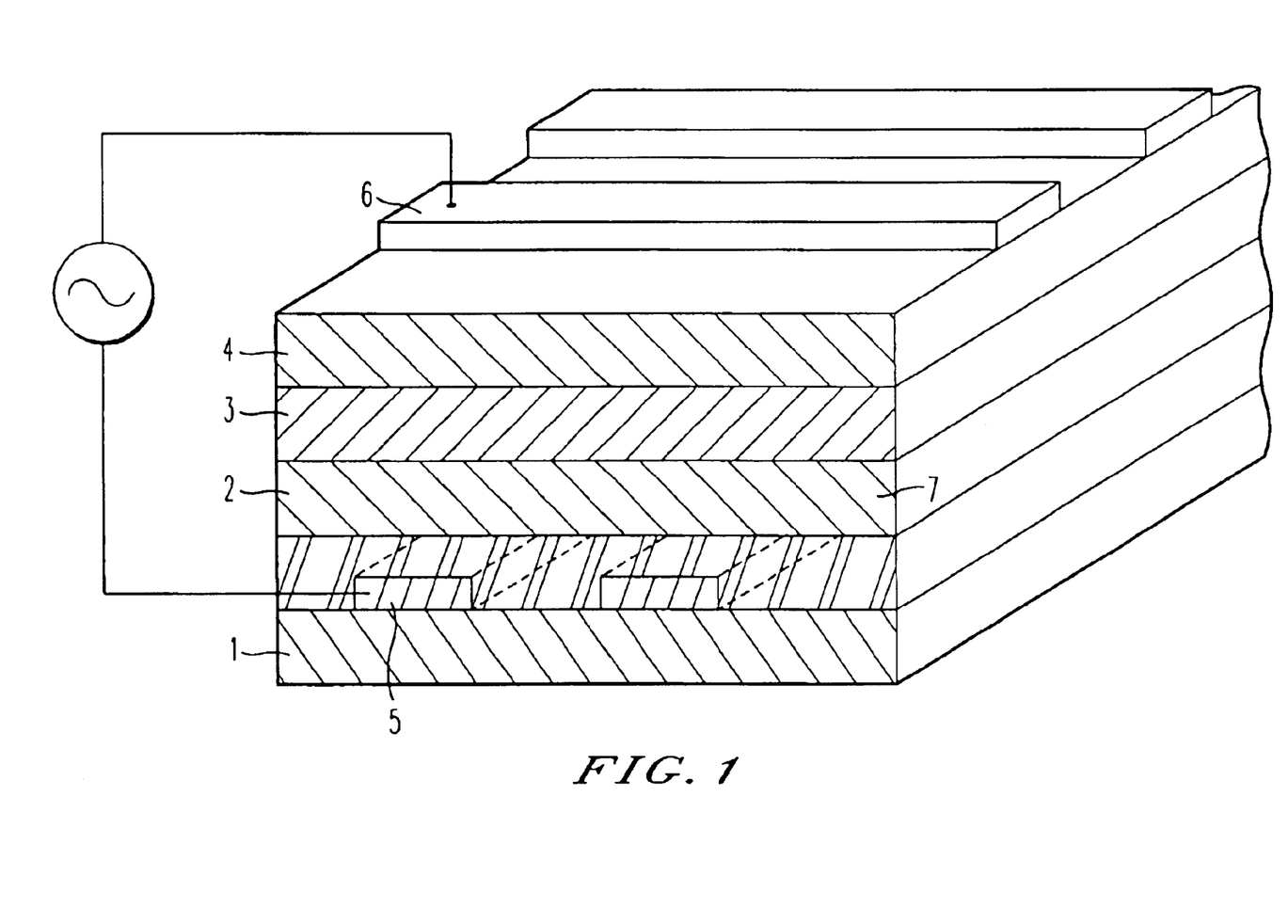
FIG. 1 is a sectional view in partly cut-away form illustrative of one exemplary structure of an EL device using the EL phosphor multilayer thin film of the invention.

Such a structure as shown in FIG. 1 should preferably be formed to obtain an inorganic EL device using the EL phosphor multilayer thin film of the present invention as the light-emitting layer 3. FIG. 1 is a partly sectioned perspective view illustrating of the structure of an EL device constructed using the inventive EL phosphor multilayer thin film. Referring to FIG. 1, a lower electrode 5 is formed in a given pattern on a substrate 1, and a thick-film form of first insulating layer (thick-film dielectric layer) 2 is formed on the lower electrode 5. The first insulating layer 2 is provided thereon with a light-emitting layer 3 and a second insulating layer (thin-film dielectric layer) 4 in this order, and an upper electrode 6 is formed on the second insulating layer 4 in such a given pattern that it forms a matrix with the aforesaid lower electrode 5.

Between adjacent constituting layers, there may be provided intermediate layers such as a close-contact improving layer, a stress relaxing layer and a reaction control layer. Such a layer is shown as 7 in FIG. 1. The flatness of the thick film may be improved by polishing the surface thereof or using a flattening layer.

In the EL phosphor multilayer thin film of the present invention, the number and order of stacking, and the location, of each of the phosphor thin film and dielectric thin film may be optionally determined, and an intermediate layer or layers may be located between the phosphor thin film and the dielectric thin film. In this connection, preference is given to a structure wherein the dielectric thin film is located between the substrate and the phosphor thin film.

No particular limitation is imposed on the material used as the substrate, if it can stand up to the EL device layer formation temperature and El device annealing temperature, viz., it can have a heat resistant temperature or melting temperature of 600° C. or higher, preferably 700° C. or higher, and more preferably 800° C. or higher, allows an EL device to be formed thereon using a functional thin film such as a light-emitting layer, and can maintain given strength. For instance, the substrate may be made up of a glass material, a ceramic material based on alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride (SiN), and silicon carbide (SiC+BeO), and a heat-resistance glass material such as a crystallized glass material. Of these substrates, an alumina substrate and a crystallized glass substrate are particularly preferred because of their heat-resistant temperature of about 1,000° C. or higher. The substrate, when it is required to have thermal conductivity, should preferably be formed of beryllia, aluminum nitride, and silicon carbide.

Besides, quartz substrates, thermally oxidized silicon wafer substrates, and metal substrates based on titanium, stainless, inconel and iron may be used. When an electrically conductive substrate such as a metal substrate is used, it is preferable to form on the substrate a thick film having a built-in electrode.

For the dielectric thick-film material (for the first insulating layer), known dielectric thick-film materials may be used. Preferably in this case, a material having a relatively high specific dielectric constant should be used.

For instance, materials based on lead titanate, lead niobate, barium titanate, etc. may be used.

The dielectric thick film has a resistivity of $10^8$ Ω·cm or greater, and especially of the order of $10^{10}$ to $10^{18}$ Ω·cm. The dielectric thick film should preferably be formed of a material having a relatively high specific dielectric constant ε of the order of 100 to 10,000. The dielectric thick film should have a thickness of preferably 5 to 50 μm, and more preferably 10 to 30 μm.

No particular limitation is imposed on how to form the thick-film insulating layer. However, preference is given to a process by which a 10 to 50 μm thick film can be easily obtained, e.g., a sol-gel process and a printing-and-firing process.

When the thick-film insulating layer is formed by the printing-and-firing process, the starting material having a suitable consistent particle size is mixed with a binder to prepare a paste having a suitable viscosity. This paste is formed on a substrate by means of screen printing, and dried to obtain a green sheet. Finally, this green sheet is fired at a suitable temperature to obtain a thick film.

The thin-film insulating layer (the second insulating layer), for instance, may be formed of silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate and PMN-PT base material, and may be in a multilayer thin film or mixed thin film form composed thereof. To form the insulating layer with these materials, existing processes such as evaporation, sputtering, CVD, sol-gel and printing-and-firing processes may be used. Preferably in this case, the insulting layer should have a thickness of 50 to 1,000 nm, and especially about 100 to 500 nm.

The electrode (lower electrode) is formed at least on the substrate side or in the first dielectric material. For the electrode layer which is exposed together with the light-emitting layer to high temperature for heat treatment during thick-film formation, an ordinarily used metal electrode may be used, which electrode comprises as a main component one or two or more of palladium, rhodium, iridium, rhenium, ruthenium, platinum, silver, tantalum, nickel, chromium, titanium and the like.

Since the EL device is usually designed in such a way that the emitted light is extracted out of its side facing away from the substrate, it is preferable to use for another electrode providing the upper electrode a transparent electrode transparent to light in a given light emission wavelength range. If the substrate is transparent, then the transparent electrode can be used for the lower electrode because the emitted light can be taken out of the substrate side of the EL device. In this case, it is particularly preferable to use a transparent electrode such as a ZnO or ITO electrode. Usually, ITO contains $In_2O_3$ and SnO in stochiometric composition; however, the amount of O may deviate slightly from this composition. The mixing ratio of $SnO_2$ with respect to $In_2O_3$ should be preferably 1 to 20% by mass, and more preferably 5 to 12% by mass. Regarding IZO, the mixing ratio of ZnO with respect to $In_2O_3$ is usually of the order of 12 to 32% by mass.

The electrode may contain silicon. This silicon electrode layer may be in a polycrystal (p-Si) or amorphous (a-Si) state. If required, the silicon electrode layer should be made up of single crystal silicon.

Comprising silicon as the main component, the electrode should be doped with impurities for the purpose of ensuring electrical conductivity. Since the requirement for the dopant used as the impurities is only to ensure given electrical conductivity, ordinary dopants used for silicon semiconductors may be used to this end. For instance, B, P, As, Sb, Al and the like may be used; however, preference is given to B, P, As, Sb and Al. The concentration of the dopant is preferably of the order of 0.001 to 5 at %.

To form the electrode layer with these materials, existing processes such as evaporation, sputtering, CVD, sol-gel and printing-and-firing processes may be used. Especially when a structure wherein a thick film with a built-in electrode is formed on the substrate, it is preferable to make use of the same process as that used to form the dielectric thick film.

For the efficient application of an electric field to the light-emitting layer, the electrode layer should preferably have a resistivity of 1 Ω·cm or lower, and especially 0.003 to 0.1 Ω·cm. The electrode layer has a thickness of preferably 50 to 2,000 nm, and especially of the order of 100 to 1,000 nm although depending on the material to form the same.

EXAMPLE

The present invention is now explained in further detail with reference to some specific examples.

Example 1

An EL device was fabricated using the EL phosphor multilayer film of the present invention. The EL device had the same construction as explained with reference to FIG. 1.

The same $BaTiO_3$—$PbTiO_3$ dielectric material having a specific dielectric constant of 2,000 was used for both the substrate and the thick-film insulating layer, and a Pd electrode for the lower electrode. The lower electrode and thick-film insulating layer were screen printed on a substrate sheet to form a green sheet. After co-firing of these parts, the sheet was polished on the surface to obtain a substrate having a thick-film form of first insulating layer of 30 μm in thickness.

Then, this substrate was used as an underlying structure, on which a $BaTiO_3$ film was formed by sputtering.

The $BaTiO_3$ film was formed at an Ar gas pressure of 4 Pa and a 13.56 MHz high-frequency electrode density of 2 W/cm$^2$, using a magnetron sputtering system wherein a $BaTiO_3$ ceramic material was used as a target. The then film deposition rate was about 5 nm/min., and a thickness of 400 nm was obtained by control of the sputtering time. The resulting $BaTiO_3$ thin film was in an amorphous state, and the heat treatment of this film at 700° C. gave a specific dielectric constant of 500. By X-ray diffraction, the heat-treated $BaTiO_3$ thin film was found to have a perovskite structure. This $BaTiO_3$ film was also found to have a composition in a 5% excess of Ba with respect to its stoichiometric composition.

Then, a barium thioaluminate phosphor thin film was formed on this dielectric thin film, using a multiple evaporation process with two E guns. An EB source charged with BaS powders with 5 mol % of Eu added thereto and an EB source charged with $Al_2S_3$ powders were positioned in a vacuum chamber with $H_2S$ introduced thereinto. The feed materials were simultaneously evaporated from the respective sources to deposit a $BaAl_2O_3S$:Eu layer on a rotating substrate heated to 500° C. The rate of evaporation of the feed materials from the respective evaporation sources was controlled in such a way that the $BaAl_2O_3S$:Eu layer was formed on the substrate at a deposition rate of 1 nm/sec. In the meantime, 20 SCCM of $H_2S$ gas were introduced into the vacuum chamber. After the thin film had been formed, it was annealed for 20 minutes in the air of 700° C. to obtain a phosphor thin film of 300 nm in thickness.

An X-ray fluorescence analysis of the $BaAl_2O_3S$:Eu thin film formed as a monitor on an Si substrate has shown that the atomic ratio thereof is Ba:Al:O:S:Eu= 7.43:19.15:60.15:12.92:0.35.

Furthermore, the second insulating thin-film layer was formed on the phosphor thin film. For the second insulating thin-film layer, $Ta_2O_5$ was formed to a thickness of 200 nm. On the second insulating thin-film layer, an ITO transparent electrode of 200 nm in thickness was formed at a substrate temperature of 250° C. by means of an RF magnetron sputtering process using an ITO oxide target, thereby finishing up the EL device.

Figure 3:
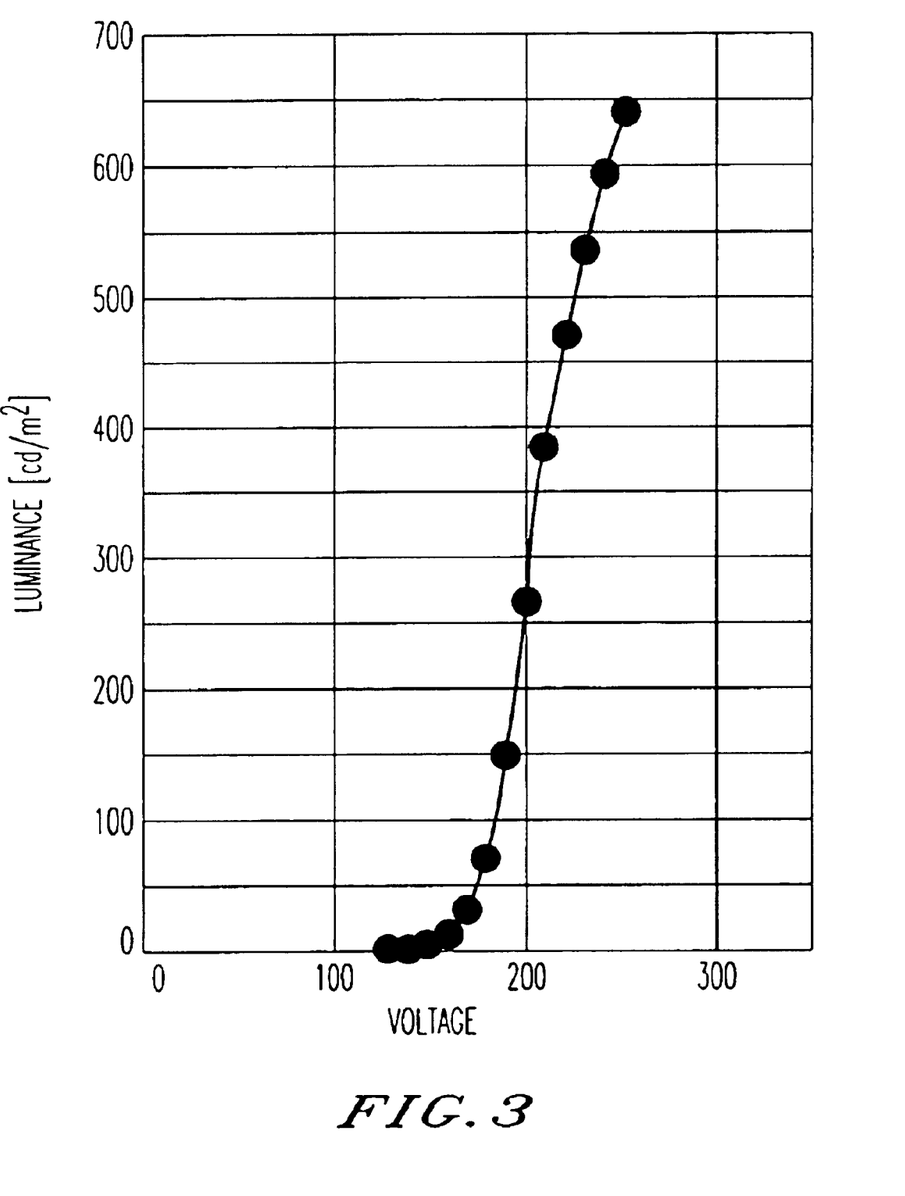
FIG. 3 is a graph showing the luminance vs. voltage characteristics of the EL phosphor multilayer thin film obtained in Example 1.
Figure 4:
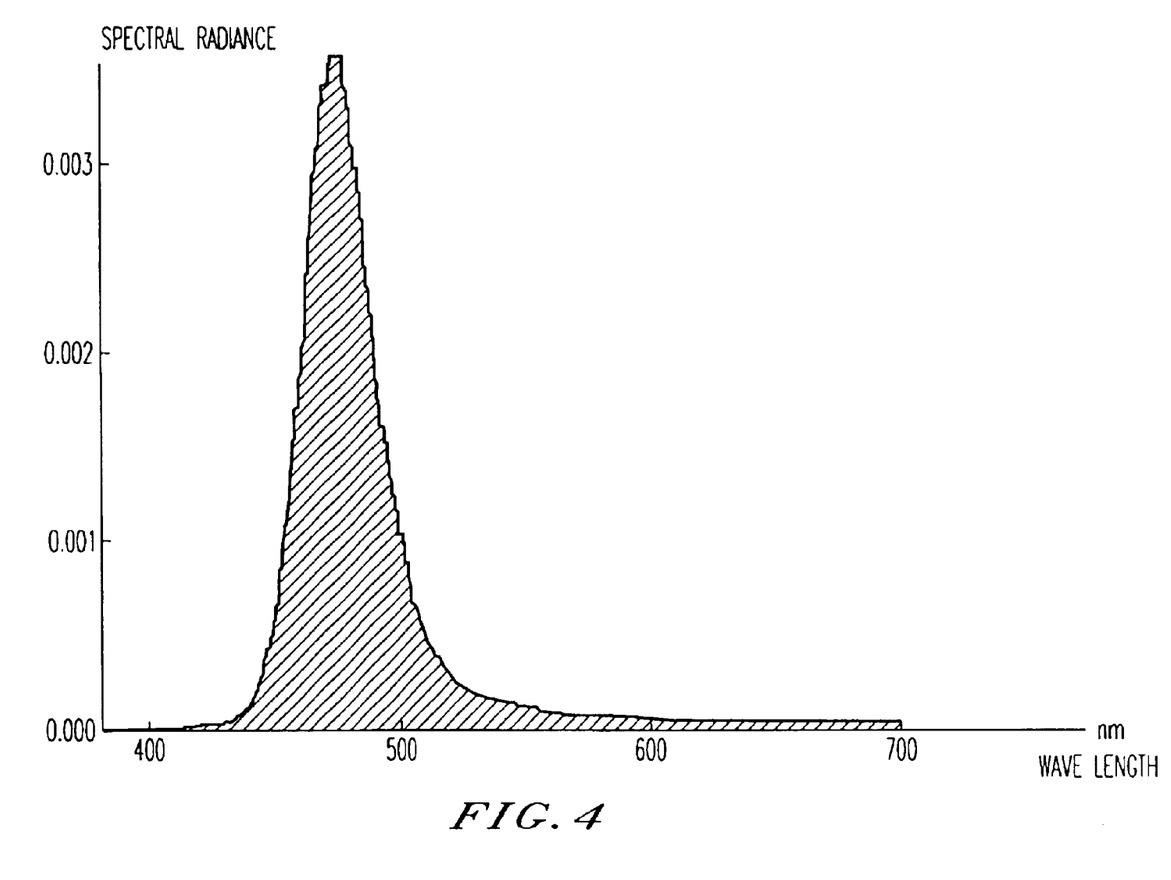
FIG. 4 a graph showing the emission spectra of the EL device of Example 1.

The light emission properties of this EL device were evaluated. While electrodes were led out of the ITO upper electrode and Pd upper electrode, a bipolar electric field of 40 $\mu$S in pulse width was applied at 1 kHz. The luminance vs. voltage characteristics are shown in FIG. 3. As can also be seen from FIG. 3, a light emission luminance of 650 $cd/m^2$ was obtained with satisfactory reproducibility. Blue emitted from an EL panel fabricated using this EL device had CIE 1931 chromaticity coordinates (0.1295, 0.1357), and the peak wavelength of emission spectra was 471 nm. The EL emission spectra are shown in FIG. 4.

Figure 5:
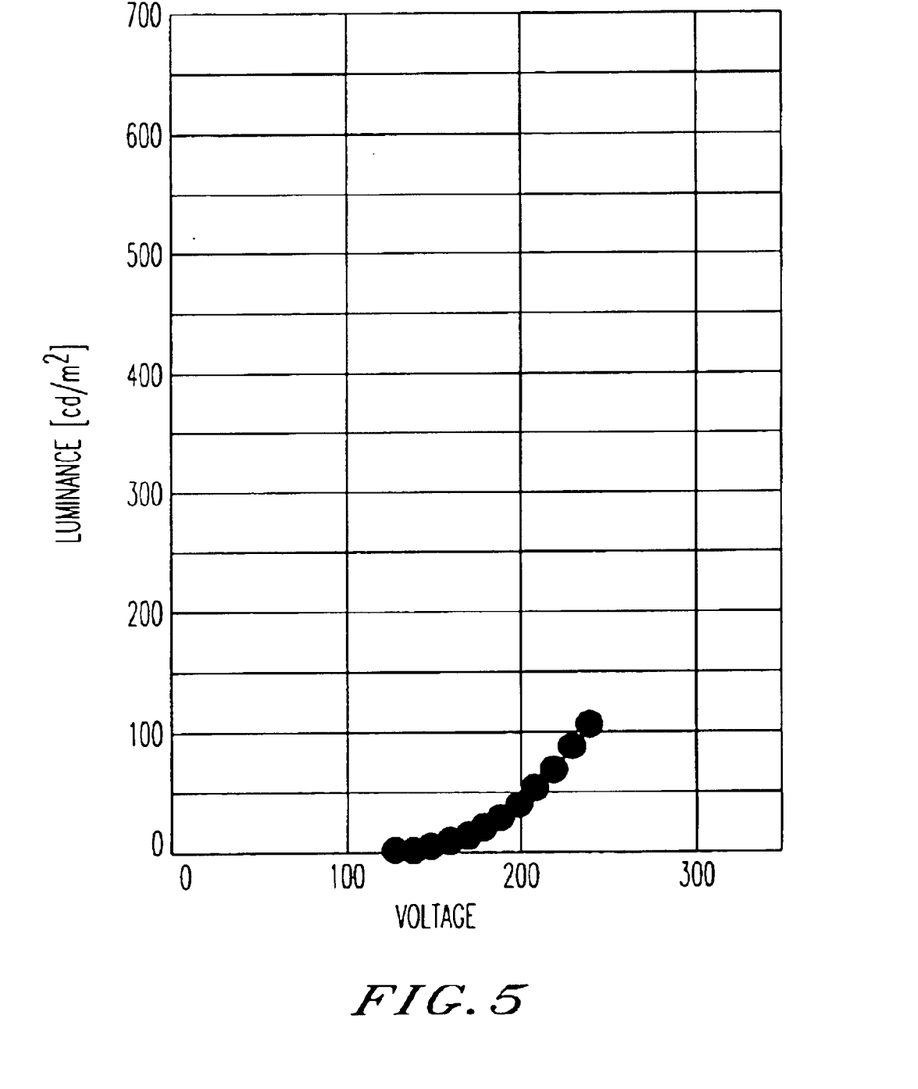
FIG. 5 is a graph showing the luminance vs. voltage characteristics of the comparative phosphor film sample obtained in Example 1.

For a comparative example, an EL device was prepared under much the same conditions as mentioned above with the exception that no $BaTiO_3$ dielectric thin film was used. As shown in FIG. 5, the luminance of this EL device was 100 $dc/m^2$ or ⅙ or less of the luminance obtained in the inventive example. It is thus found that the EL phosphor multilayer thin film of the present invention makes dramatic luminance improvements.

Using an Auger analysis method, the samples of the inventive and comparative examples were evaluated in terms of impurities in the thickness direction. In the comparative example, the Pb element was detected from the phosphor thin film area. This was probably due to the diffusion of the Pb element in the $BaTiO_3$—$PbTiO_3$ dielectric material used for the substrate and thick-film insulating layer. In the inventive example, no Pb element was detected from the phosphor thin film area, and an increased amount of oxygen was found on the phosphor side of the interface between the $BaTiO_3$ dielectric film and the phosphor thin film.

These results reveal that the luminance of the EL device is dramatically improved by the effect explained with reference to the advantages of the invention.

Example 2

An EL device was prepared as in Example 1 with the exception that a strontium thiogallate phosphor thin film with Eu added thereto as a luminescent center and strontium titanate were used as the phosphor thin film and dielectric thin film, respectively. Consequently, much the same results as in Example 1 were obtained. In this case, green light was emitted.

Example 3

An EL device was prepared as in Example 1 with the exception that a strontium thioindate phosphor thin film with Sm added thereto as a luminescent center and strontium titanate were used as the phosphor thin film and dielectric thin film, respectively. Consequently, much the same results as in Example 1 were obtained. In this case, red light was emitted.

Advantages of the Invention

According to the EL phosphor multilayer thin film of the invention, it is possible to obtain an EL device capable of emitting light with improved luminance. If the EL phosphor multilayer thin film of the invention is used with other forms of devices, blue light in particular can be obtained with luminance higher than ever before. The use of the blue light-emitting device can provide a full-color panel for display purposes.

What we claim is:

1. An EL phosphor multilayer thin film, comprising a phosphor thin film, a dielectric thin film and an underlying structure containing Pb, wherein the phosphor thin film and the dielectric thin film are stacked one upon the another, the dielectric thin film is present on the underlying structure, said phosphor thin film comprises a matrix material containing an alkaline earth thioaluminate as a main component and a rare earth element as a luminescent center, and said dielectric thin film comprises a perovskite oxide.

2. The EL phosphor multilayer thin film according to claim 1, wherein the matrix material is a barium thioaluminate.

3. The EL phosphor multilayer thin film according to claim 1, wherein the rare earth element is Eu.

4. The EL phosphor multilayer thin film according to claim 1, wherein the perovskite oxide is barium titanate.

5. The EL phosphor multilayer thin film according to claim 1, wherein the dielectric thin film has a specific dielectric constant of 100 or greater.

6. The EL phosphor multilayer thin film according to claim 1, wherein the dielectric thin film has a thickness of 100 nm or greater.

7. An EL device comprising the EL phosphor multilayer thin film as claimed in claim 1.

8. The EL phosphor multilayer thin film according to claim 1, wherein the dielectric thin film is interposed between the underlying structure and the phosphor thin film.

* * * * *